US012704993B2

(12) United States Patent
Wang et al.

(10) Patent No.: US 12,704,993 B2
(45) Date of Patent: Aug. 11, 2026

(54) METHODS OF OPERATING MULTI-ZONE MEMORY SYSTEMS, MEMORY SYSTEMS, HOSTS AND MEMORY CONTROLLERS

(71) Applicant: YANGTZE MEMORY TECHNOLOGIES CO., LTD., Wuhan (CN)

(72) Inventors: Yalei Wang, Wuhan (CN); Hongbo Wang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 60 days.

(21) Appl. No.: 18/807,578

(22) Filed: Aug. 16, 2024

(65) Prior Publication Data

US 2025/0328276 A1 Oct. 23, 2025

(30) Foreign Application Priority Data

Apr. 19, 2024 (CN) ........................ 202410479301.0

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ....... G06F 3/0655; G06F 3/0604; G06F 3/064
See application file for complete search history.

(56) References Cited

U.S. PATENT DOCUMENTS 9,383,923 B1 * 7/2016 Malina ............. G11B 20/10527
10,073,735 B1 * 9/2018 Cai ..................... G06F 11/1048
12,411,602 B2 * 9/2025 Oikawa ................. G06F 3/0656
2016/0170639 A1 * 6/2016 Velayudhan .......... G06F 3/0689 711/114
2022/0156087 A1 * 5/2022 Karr .................... G06F 12/0246

* cited by examiner

*Primary Examiner* — Nicholas A. Paperno
(74) *Attorney, Agent, or Firm* — Conley Rose, P.C

(57) ABSTRACT

An example method includes obtaining a first zone mapping table, wherein the first zone mapping table includes first write pointers for multiple zones, the multiple zones are obtained by dividing a logical address space corresponding to a non-volatile storage device, and a first write pointer indicates a predicted next writable LBA in a zone; obtaining a second zone mapping table, wherein the second zone mapping table includes second write pointers for the multiple zones, and a second write pointer indicates a next writable LBA in a zone; and determining a zone in the multiple zones, for which the first write pointer and the second write pointer are different, to be a dirty zone based on the first zone mapping table and the second zone mapping table.

20 Claims, 6 Drawing Sheets

METHODS OF OPERATING MULTI-ZONE MEMORY SYSTEMS, MEMORY SYSTEMS, HOSTS AND MEMORY CONTROLLERS

CROSS-REFERENCE TO RELATED APPLICATIONS

The present application claims the benefit of priority to Chinese Patent Application No. 2024104793010, filed on Apr. 19, 2024, the content of which is incorporated herein by reference in its entirety.

TECHNICAL FIELD

The present application relates to the field of storage technology, and in particular to a method of operating a memory system, a memory system, a host and a memory controller.

BACKGROUND

With the continuous upgrading of storage media and the increasing user demands for memory system performance, a memory system that supports zoned storage have emerged, this memory system has a zoned namespace (ZNS) interface, the ZNS interface divides the logical address space of the non-volatile storage device into multiple zones, each zone consists of a logical block address (LBA) interval, the logical block address interval includes multiple LBAs, a write pointer (WP) exists for each zone, the WP indicates the next writable LBA in the zone. Each zone may be read in any order, but must be written sequentially, writing sequentially can improve information for the placement of data within a non-volatile storage device in a memory system, allowing the memory system to achieve higher performance by a higher write throughput and larger storage capacity.

SUMMARY

Examples of the present application provide methods of operating a memory system, memory systems, hosts, and memory controllers.

In a first aspect, a method of operating a memory system is provided. The method includes: obtaining a first zone mapping table, the first zone mapping table includes first write pointers for multiple zones, the multiple zones are obtained by dividing the logical address space corresponding to the non-volatile storage device, the first write pointer indicating a predicted next writable logical block address (LBA) in the zone; obtaining a second zone mapping table, the second zone mapping table including second write pointers for the multiple zones, the second write pointer indicating a next writable LBA in the zone; based on the first zone mapping table and the second zone mapping table, determining a zone in the multiple zones for which the first write pointer and the second write pointer are different to be a dirty zone.

In some examples, the method further includes: during the power-on phase after dirty power loss of the memory system, performing the operation of determining a zone in the multiple zones for which the first write pointer and the second write pointer are different to be a dirty zone based on the first zone mapping table and the second zone mapping table.

In some examples, the multiple zones described above are in an open state.

In some examples, the method further includes: receiving a write instruction, the write instruction including first data and a first LBA; predicting the next writable LBA in the logical address space after the first data is written based on the first LBA, to obtain a second LBA; updating the first zone mapping table based the second LBA.

In some examples, the method further includes: after updating the first zone mapping table, storing the updated first zone mapping table in a non-volatile storage device.

In some examples, the method further includes: after updating the first zone mapping table, writing the first data into the logical address space based on the write instruction, to obtain a third LBA, wherein the third LBA is the next writable LBA in the logical address space; updating the second zone mapping table based on the third LBA.

In some examples, the method further includes: after updating the second zone mapping table, storing the updated second zone mapping table in a non-volatile storage device.

In some examples, the method further includes at least one of: storing the first zone mapping table into a non-volatile storage device every time a first period of time passes; or storing the second zone mapping table into a non-volatile storage device every time a second period of time passes.

In some examples, the first period of time and the second period of time are the same.

In some examples, the first period of time is different from the second period of time.

In some examples, the method further includes: storing the first zone mapping table and the second zone mapping table into a non-volatile storage device through a checkpoint operation.

In a second aspect, a method of operating a memory system is provided, the method including: receiving a write instruction, the write instruction including first data and a first logical block address (LBA), the first LBA belonging to a logical address space corresponding to a non-volatile storage device; predicting a next writable LBA in the logical address space after the first data is written based on the first LBA, to obtain a second LBA; based on the second LBA, updating a first zone mapping table, the first zone mapping table including first write pointers for multiple zones in the logical address space, the first write pointer indicating a predicted next writable LBA in the zone.

In some examples, the method further includes: obtaining a second zone mapping table, the second zone mapping table including second write pointers for the multiple zones, the second write pointer indicating the next writable LBA in the zone; based on the first zone mapping table and the second zone mapping table, determining a zone in the multiple zones for which the first write pointer and the second write pointer are different to be a dirty zone.

In some examples, the method further includes: during the power-on phase after dirty power loss of the memory system, performing the operation of determining a zone in the multiple zones for which the first write pointer and the second write pointer are different to be a dirty zone based on the first zone mapping table and the second zone mapping table.

In some examples, the method further includes: after updating the first zone mapping table, writing the first data into the logical address space based on the write instruction, to obtain a third LBA, wherein the third LBA is the next writable LBA in the logical address space; updating the second zone mapping table based on the third LBA.

In some examples, the method further includes: after updating the second zone mapping table, storing the updated second zone mapping table in a non-volatile storage device.

In some examples, the method further includes at least one of: storing the first zone mapping table into a non-volatile storage device every time a first period of time passes; or storing the second zone mapping table into a non-volatile storage device every time a second period of time passes.

In some examples, the first period of time and the second period of time are the same.

In some examples, the first period of time is different from the second period of time.

In some examples, the method further includes: storing the first zone mapping table and the second zone mapping table into a non-volatile storage device through a checkpoint operation.

In some examples, the method further includes: after updating the first zone mapping table, storing the updated first zone mapping table in a non-volatile storage device.

In some examples, the multiple zones described above are in an open state.

In a third aspect, a memory system is provided, in some examples, the memory system includes a memory controller and a storage device; the memory controller is configured to: obtain a first zone mapping table, the first zone mapping table includes first write pointers for multiple zones, the multiple zones are obtained by dividing the logical address space corresponding to the non-volatile storage device, the first write pointer indicating the predicted termination write location of the data to be written in the zone; obtain a second zone mapping table, the second zone mapping table including second write pointers for the multiple zones, the second write pointer indicating the termination write location of the written data in the zone; based on the first zone mapping table and the second zone mapping table, determine a zone in the multiple zones for which the first write pointer and the second write pointer are different to be a dirty zone.

In some examples, the memory controller is further configured to perform any optional implementation of the first aspect, or to perform the second aspect or any optional implementation of the second aspect.

In a fourth aspect, a host is provided, the host including a memory controller for controlling a non-volatile storage device, the memory controller is configured to perform a method of the first aspect, any optional implementation of the first aspect, the second aspect or any optional implementation of the second aspect described above.

In a fifth aspect, a memory controller is provided, the memory controller includes a memory interface and a processor, the memory interface is used to connect a non-volatile storage device, and the processor is used to execute program codes to cause the memory controller to perform a method of the first aspect, any optional implementation of the first aspect, the second aspect or any optional implementation of the second aspect described above.

In a sixth aspect, a computer-readable storage medium is provided, the storage medium stores at least one program code, and the at least one program code is read by the processor in the memory controller to cause the memory controller to perform a method of the first aspect, any optional implementation of the first aspect, the second aspect or any optional implementation of the second aspect described above.

In a seventh aspect, a computer program product or computer program is provided, the computer program product or computer program including program codes, the program codes are stored in a computer-readable storage medium, the program codes are read by the processor in the memory controller from the computer-readable storage medium, and executed by the processor to cause the memory controller to perform a method of the first aspect, any optional implementation of the first aspect, the second aspect or any optional implementation of the second aspect described above.

DETAILED DESCRIPTION

In order to make the purpose, technical solution and advantages of the present application clearer, implementations of the present application will be further described in detail below in conjunction with the accompanying drawings.

In the present application, the terms "first", "second" and other words are used to distinguish the same or similar items with basically the same function and function, and it is to be understood that there is no logical or temporal dependence between the "first", "second" and "n-th", nor limit on the number or performing order. It is also to be understood that, although the following description uses the terms first, second, etc., to describe various elements, these elements should not be limited by the terms.

These terms are only used to distinguish one element from another. For example, a first element could be termed a second element, and similarly, a second element could be termed a first element, without departing from the scope of various examples. Both the first element and the second element may be elements, and in some cases, may be separate and distinct elements.

Wherein at least one refers to one or more than one, e.g., at least one element may be one element, two elements, three elements, or any integer number of elements, the integer is greater than or equal to one. At least two refers to two or more, e.g., at least two elements may be two elements, three elements, or any integer number of elements, the integer is greater than or equal to two.

Figure 1:
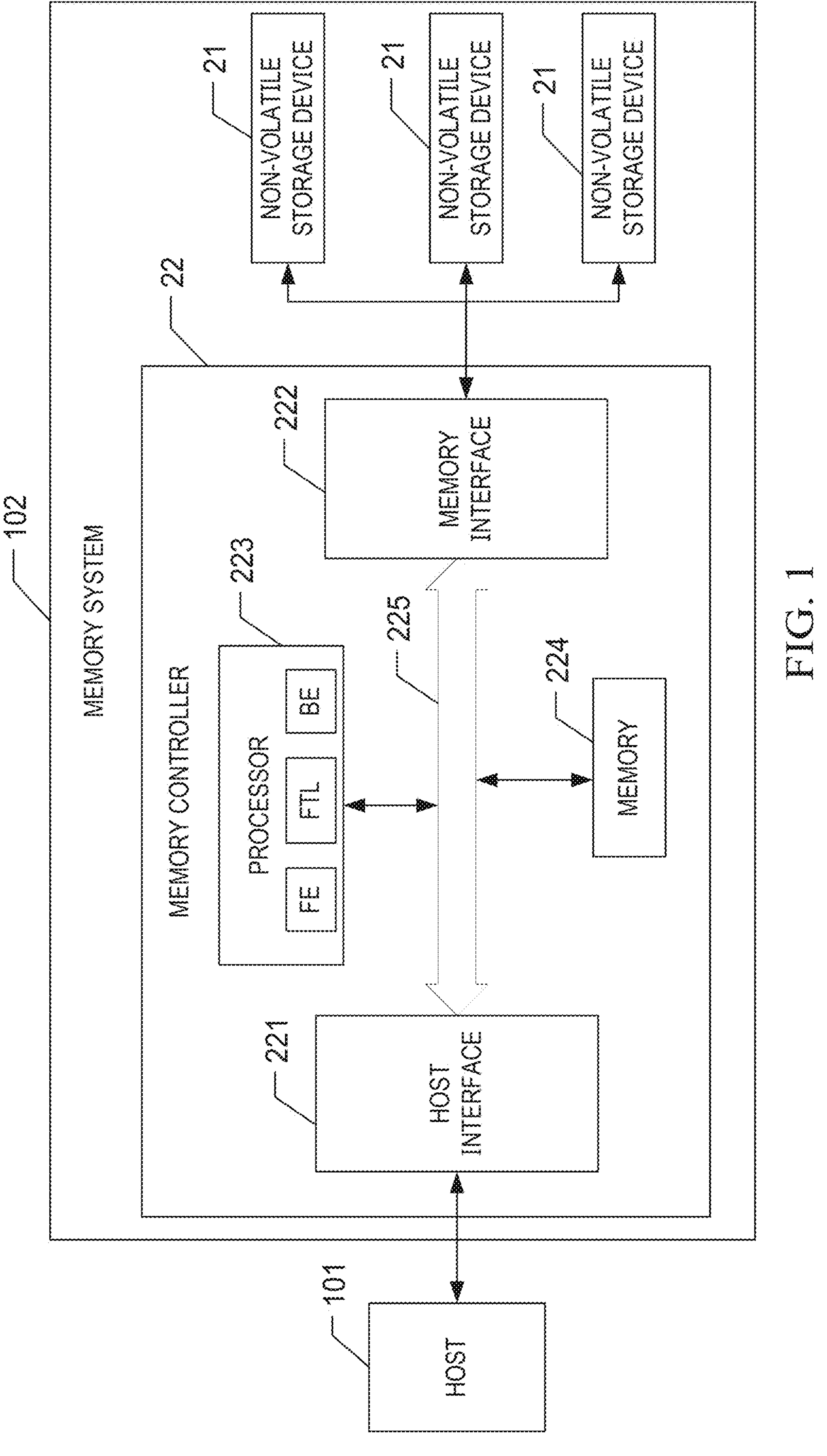
FIG. 1 is a schematic diagram of an application environment of a memory system according to an example of the present disclosure.

FIG. 1 is a schematic diagram of an application environment of a memory system according to an illustrated example, as shown in FIG. 1, the application environment includes a host 101 and a memory system 102, where the host 101 may be may be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory therein. According to the interface protocol between the memory system 102 and the host 101, the memory system 102 may be configured as a universal flash storage (UFS) device, a solid state drive (SSD), a multimedia card (MMC), a secure digital (SD) card, a Computer Memory Card International Association (PCMCIA) card type storage device, a Peripheral Component Interconnect (PCI) type storage devices, a PCI Express (PCI-E) type storage device, a Compact Flash (CF) card, a smart media card or a memory stick, etc., wherein a multimedia card (MMC) such as an embedded multimedia card (eMMC), small size multimedia card (RS-MMC) and micro MMC, etc., a SD card such as a mini SD and a micro SD.

The host 101 may control the operations of the memory system 102, e.g., the host 101 may control the operation of the memory system 102 through instructions, as an example, the host 101 sends instructions to the memory system 102, and the memory system 102 performs corresponding operations (e.g., operation such as data program, data read and data erase, or other operations) in response to the instructions of the host 101. In some examples, the host 101 may include a host processor and a host memory, and the host processor may control the operation of the host 101. For example, the host processor may interact with the memory system 102 through a storage driver to control the operation of the memory system 102. The storage driver may be a software module used to control the memory system 102, and the storage driver may also load the mapping table into the host memory to increase the speed at which the host processor controls the memory system 102 to perform a read operation.

The memory system 102 may store data that the host 101 accesses, and the host 101 may be configured to send the data to the memory system 102. Alternatively, the host 101 may be configured to receive data from the memory system 103.

As shown in FIG. 1, the memory system 102 includes a non-volatile storage device 21 and a memory controller 22, wherein there is at least one non-volatile storage device 21, and the non-volatile storage device 21 is a storage medium used to store data in the memory system 102, the non-volatile storage device 21 is e.g., a NAND flash memory device, a three-dimensional (3D) NAND flash memory device, etc.

The memory controller 22 may control the non-volatile storage device 21. In FIG. 1, the memory controller 22 is deployed outside the host 101, the memory controller 22 is coupled to the host 101 and communicates with the host 101, and the memory controller 22 and the non-volatile storage device 21 are integrated into the memory system 102. In other examples, the memory controller 22 is not integrated in the memory system 102, but the memory controller 22 is integrated in the host 101, and the memory controller 22 in the host 101 communicates with the non-volatile storage device 21 outside the host 101 to control the non-volatile storage device 21. In other examples, a part of functional modules of the memory controller 22 are integrated in the host 101, and another part of the functional modules are integrated in the memory system 102, these two parts of functional modules cooperate with each other to control the non-volatile storage device 21. For example, the front end (FE) and flash translation layer (FTL) functions of the memory controller 22 are integrated in the host 101, and the back end (BE) function of the memory controller 22 is integrated in the memory system 102; or the FE function of the memory controller 22 is integrated in the host 101, and the FTL and BE functions of the memory controller 22 are integrated in the memory system 102.

The memory controller 22 is also coupled to the non-volatile storage device 21, manages data stored in the non-volatile storage device 21, and is responsible for data scheduling between the non-volatile storage device 21 and the host 101. The memory controller 22 may be configured to control operations of non-volatile storage device 21, e.g., read, erase and program operations. The memory controller 22 may also be configured to manage various functions related to data stored or to be stored in the non-volatile storage device 21, including but not limited to bad block management, garbage collection, logical-to-physical address translation, wear leveling, etc. The memory controller 22 may also perform any other suitable functions, e.g., formatting the non-volatile storage device 21.

For example, as shown in FIG. 1, the memory controller 22 includes a host interface 221, a memory interface 222, a processor 223, a memory 224 and a bus 225, and various components (e.g., 221-224) in the memory controller 22 except the bus 225 are connected to the bus 225 and communicate with each other through the bus 225. The memory controller 22 may control memory system 102 to perform operations by driving firmware or software. The memory controller 22 may decode and drive code-type instructions or algorithms, e.g., firmware or software. And the memory controller 22 may be implemented as hardware or a combination of hardware and software.

The host interface 221 may connect to the host 101 and communicate with the host 101 according to an interface protocol, wherein the interface protocol may be any one of MMC protocol, Peripheral Component Interconnect (PCI) protocol, PCI Express (PCI-E) protocol, Advanced Technology Attachment (ATA) protocol, Serial ATA protocol, Parallel (ATA) protocol, Small Computer Small Interface (SCSI) protocol, Enhanced Small Disk Interface (ESDI) protocol, Integrated Drive Electronics (IDE) protocol, Firewire protocol.

The memory interface 222 may connect to the non-volatile storage device 21 according to a corresponding interface protocol. In some examples, the memory interface 222 communicates and interacts with the non-volatile storage device 21 through the Open NAND Flash Interface (ONFI) protocol. The memory interface 222 may control the non-volatile storage device 21 according to the processor 223. The memory interface 222 may provide a control signal to the non-volatile storage device 21, and the control signal may include a command, address, operation control signal, etc., for controlling the non-volatile storage device 21.

The processor 223 is responsible for computing and system scheduling, the firmware or software of the memory controller 22 runs on the processor 223, the processor 223 controls the memory system 102 to perform operations by driving the firmware or software, e.g., scheduling the memory system 102, to implement write, read and other background operations of data from the host 101 to the non-volatile storage device 21.

There are many types of firmware for the memory controller 22, e.g., FE, FTL, and BE. Among them, FE is used to control the host interface 221 and communicate with the host 101, e.g., obtaining the instructions sent by the host 101 through the host interface 221 (e.g., read instruction, write instruction or other types of instructions), sending an instruction sent by the host 101 to the backend (e.g., at least one of FTL or BE) for processing, obtaining the processing result of the instruction from the backend, and returning the processing result to the host 101 through the host interface 221. In some examples, FE is also used to verify whether an instruction from the host 101 are legal, and if the instruction from the host 101 is legal, the legal instruction is sent to the backend for processing.

FTL is the core component of the memory controller firmware, and its main task is to complete the mapping of the logical address space of the host 101 to the physical address space of the non-volatile storage device, in addition, it also has functions such as garbage collection, wear leveling, bad block management, read interference management, data retention management and error handling, etc. The processor 223 may drive the FTL in order to control the inherent operation of the non-volatile storage device 21 and provide device compatibility to the host 101. When driving FTL, the host 101 may view and use memory system 102 as a general-purpose storage device such as a hard disk.

The processor 223 may be any suitable integrated circuit configured to receive instructions from the host 101 and perform read, program and erase operations of the storage device by transmitting at least one of commands or data to the non-volatile storage device 21 via the memory interface 222. For example, the processor 223 receives requests for non-volatile storage device 21 (e.g., read or write operation) from one or more hosts 101 through the host interface. The processor 223 may also be configured to communicate with and control other components of the memory controller 22.

The processor 223 may also be used to execute program code, so that the memory controller 22 implements the method of operating the memory system described below, and the program code may be stored in the memory 224 of the memory controller 22, or in in the firmware of the memory controller 22 of the non-volatile storage device 21. In some examples, the present application also provides a computer-readable storage medium that stores at least one program code, the processor 223 reads and executes the at least one program code to cause the memory controller 22 to perform the method of operating the memory system introduced below. The computer-readable storage medium may be the non-volatile storage device 21 or a storage medium in the non-volatile storage device 21. In other examples, the present application also provides a computer program product or computer program, the computer program product or computer program including program code, the program code is stored in a computer-readable storage medium, the program code is read by the processor from the computer-readable storage medium, and executed by the processor to cause the memory controller to perform the method of operating the memory system introduced below.

The physical address space provided by one or more non-volatile storage devices 21 in the memory system 102 may be overlaid with the logical address space of the memory system 102. Wherein the physical address space includes multiple physical addresses, the physical address may be a physical cluster address (PCA) or a physical block address (PBA), the logical address space includes multiple LBAs, each LBA in the logical address space may be mapped to a physical address in the physical address space, so that the logical address space can cover and express the physical address space, that is, the logical address control corresponds to the physical address space.

The memory controller 22 may take the logical address space of memory system 102 as a zoned namespace (ZNS). Alternatively, the logical address space of the memory system 102 is divided into multiple ZNSs, a ZNS is a namespace associated with a set of commands for a zoned namespace, a set of commands for a zoned namespace is based on a set of commands for a non-volatile memory (NVM). Each ZNS is a range of LBAs, including each LBA within the range of LBAs, the capacities (e.g., sizes) of different ZNSs in the multiple ZNSs may be the same or different, wherein the capacity of ZNS may be represented by the offset between the starting LBA and the termination LBA of the ZNS, and the starting LBA and termination LBA of the ZNS are the first LBA and the last LBA in the ZNS respectively. In addition to ZNS, the memory system 102 may also include one or more conventional namespaces, which may also be provided by the non-volatile storage 21.

Figure 2:
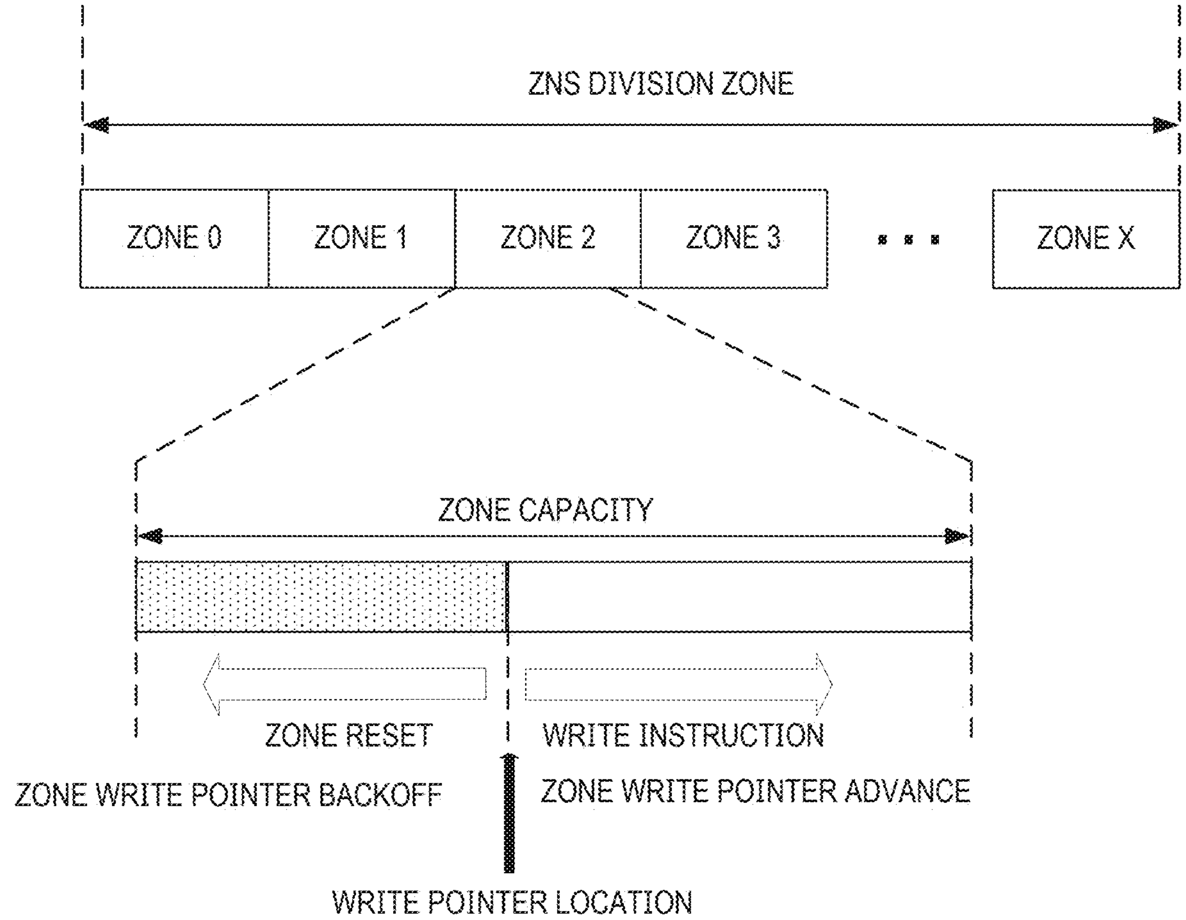
FIG. 2 is a schematic diagram of dividing zones of a memory system according to an example of the present disclosure.

For any ZNS, the ZNS may be divided into a set of zones of the same size, these zones are continuous and non-overlapping LBA ranges. As shown in FIG. 2, the memory controller 22 may divide the ZNS into X+1 zones, and the X zones are numbered from 0 (e.g., zone 0) according to the ascending order of LBAs in each zone, to obtain zone 0 to zone X, where X is an integer greater than 0.

For any zone, the zone includes multiple LBAs, the first LBA in the zone may be referred to as the zone start logical block address (ZSLBA) of the zone, and the last LBA in the zone may be referred to as the zone termination logical block address (ZTLBA) of the zone, and the ZSLBA of the zone or the number of the zone may be used as the identifier of the zone to indicate the zone. The capacity of a zone (e.g., zone size) may be represented by the offset between the ZSLBA and ZTLBA of the zone, and the capacities (e.g., zone size) of different zones in ZNS may be the same or different.

A zone descriptor that contains a set of attributes exists in each zone. A region management receiving command may be used to retrieve one or more zone descriptors. A zone may include the following attributes.

Zone type: The zone type attribute defines the rules for reading and writing a zone, e.g., the zone type requires sequential writing, and the zone type that requires sequential writing requires the range of logical block addresses of the zone to be written sequentially, and the host 101 may use commands such as a command, write zero command, write uncorrectable command, copy command or additional zone command to write data to this type of zone.

Zone state: Each zone corresponds to a set of states, each state and the zone type together define the operating features of the region, and state of the zone will be introduced with FIG. 3.

Write Pointer (WP): The write pointer attribute defines the next writable LBA in the zone. The validity of the write pointer is specific to the region state and is defined according to the zone type, which is referred to the relevant standard protocol for details, the write pointer will be introduced later in conjunction with FIG. 2.

Zone capacity: defines the writable capacity of the zone, not all logical blocks in the zone may be used by the host, the number of LBAs in a zone that may be used by the host is referred to as zone capacity, and the zone capacity is less than or equal to the zone size.

Zone descriptor extension valid: used to define the validity of extended data of the zone descriptor of the zone.

Reset zone recommendation: indicates that the memory controller recommends that the host resets the zone.

Complete zone recommendation: indicates that the memory controller recommends that the host completes the zone.

For any zone, the write pointer for that zone indicates the next writable LBA in the zone, this writable LBA is the next LBA of the termination write LBA of the written data in the zone, the termination write LBA is the termination write location of the written data in the zone, which may also be understood as the largest LBA among the LBAs occupied by the written data. As shown in FIG. 2, the black part in zone 2 is the written data, and the write pointer indicates the location which is after and adjacent to the black part. The write pointer may be the offset between the next writable LBA in the zone and the ZSLBA of the zone, so that the write pointer may point to the next writable LBA in the zone starting from the ZSLBA of the zone, e.g., the next writable LBA pointed to by the write pointer of 0 is ZSLBA.

The next writable LBA indicated by the write pointer may be used as the starting write location when writing data to the corresponding zone next time. Taking zone 2 in FIG. 2 as an example, data is written starting from the location indicated by the write pointer for zone 2, and the location indicated by the write pointer for zone 2 will be advanced or updated to point to the writable LBA in response to the next write instruction from host 101, in order to keep track of the next starting write location, thus the write pointer indicates the location at which the next write to the zone will start.

Figure 3:
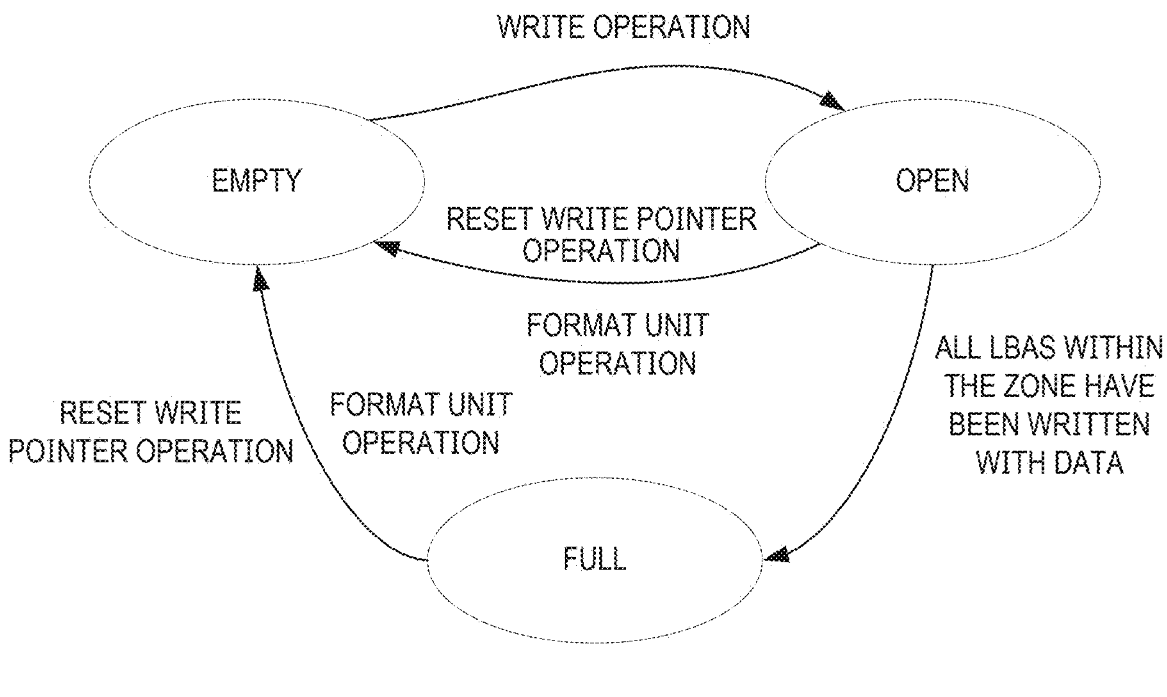
FIG. 3 is a schematic diagram of switching states of a zone according to an example of the present disclosure.

As shown in FIG. 3, the state of the zone may be divided into empty state, open state and full state, wherein the empty state indicates that data writing has not started in the zone. At this point, the zone has not been mapped to the physical address space and does not support a data writing, and the write pointer for the zone points to the ZSLBA of the zone; the open state indicates that the zone has supported a data writing and that the zone has not been fully written with data, at this point, the zone has been mapped to the physical address space, and the write pointer for the zone points to any LBA in the zone except ZSLBA; the full state indicates that the zone has been fully written with data, and at this point, the zone has been mapped to the physical address space.

The zone may be switched among the empty state, the open state and the full state, as shown in FIG. 3, for a certain zone in the empty state, the memory controller 22, in response to the write instruction for the zone, allocates a physical address space to the empty zone, so that the LBA in the empty zone is mapped to the physical address in the physical address space; switches the zone from the empty state to the open state, and performs a write operation on the physical address space corresponding to the zone to implement a data writing into the zone, and if the zone is not fully written with data after the write operation is completed, when a subsequent write instruction for the zone is received again, a write operation will continue to be performed on the physical address space corresponding to the zone. When all LBAs in the zone have been written with data, that is, the zone has been fully written with data, the memory controller 22 switches the state of the zone from the open state to the full state. For a zone in an open state or a full state, if the zone meets the zone reset condition, the memory controller 22 may also switch the state of the zone to an empty state by resetting the zone. For example, the host 101 sends a zone reset instruction for the zone to the memory controller 22, and in response to the zone reset instruction, the zone meets the zone reset condition, then the memory controller 22 resets the zone, or when the internal management logic of the memory controller 22 needs to delete or recycle data for the zone, the zone meets the zone reset condition, and the memory controller 22 resets the zone. Wherein the method of resetting the zone includes, e.g., the memory controller 22 performs an operation of resetting a write pointer or formatting a cell, to erase the written data in the zone, fall back the location indicated by the write pointer for the zone to the ZSLBA of the zone, and switch the state of the zone to the empty state, thereby implementing zone reset.

For convenience of description, the zone in the empty state is referred to as an empty zone, the zone in the open state is referred to as an open zone, and the zone in the full state is referred to as a full zone.

The memory controller 22 may record the write pointer for each open zone in the memory system 102 through the zone mapping table, e.g., the zone mapping table includes write pointers for multiple open zones. In some examples, the zone mapping table further includes identifiers of the multiple open zones, and the identifier of each open zone corresponds to the write pointer for each open zone.

During the process of writing data to a certain zone, if a dirty power loss occurs in the memory system 102, causing a failure of data writing to the zone, result in the zone becoming a dirty zone. In the event of an dirty power loss in the memory system 102, during the power-on phase after the dirty power loss, the memory controller 22 restarts or initializes the memory system 102, during the process of restarting or initializing the memory system 102, the memory controller 22 needs to first determine each dirty zone in the memory system 102, and then, for each dirty zone, reconstruct the data that fails to be written due to the dirty power loss in each dirty zone, therefore, if the dirty zone in the memory system 102 may be quickly determined, the time for reconstructing data in the dirty zone and the time for restarting the memory system 102 may be effectively shortened, thus a method that can quickly determine a dirty zone in the memory system 102 is urgently needed.

In some examples, a memory controller 22 may determine a dirty zone based on the zone mapping table described above, in some examples, the memory controller 22 scans the written data in the physical address space corresponding to each open zone based on the identifier of each open zone in the zone mapping table, and obtains the termination physical address of the written data in the corresponding physical address space, and obtains the write pointer for each open zone from the zone mapping table, if the location indicated by the write pointer for any open zone is not the LBA corresponding to the termination physical address in the corresponding physical address space, the open zone will be determined as a dirty zone, and the data that fails to be written due to dirty power loss in the dirty zone is reconstructed.

In the above process of determining a dirty zone, the memory controller 22 first scans the written data in the physical address space corresponding to each open zone, and then compares the location indicated by the write pointer for the open zone with the LBA corresponding to the termination physical address in the corresponding physical address space, such that a dirty zone be determined. The method of determining a dirty zone is complicated, and the scanning of the written data in the physical address space will also increase the time required to determine a dirty zone, which causes a dirty zone in the memory system 102 cannot be quickly determined, and accordingly, the time for reconstructing data in the dirty zone and the time for restarting the memory system 102 will also be increased.

Based on this, the present application also proposes a new zone mapping table, and the memory controller may quickly determine a dirty zone in the memory system with the new zone mapping table and the zone mapping table introduced in the above.

In order to distinguish from the zone mapping table introduced earlier, the new zone mapping table is referred to as the first zone mapping table, and the zone mapping table introduced earlier is referred to as the second zone mapping table, wherein the first zone mapping table is used to record first write pointers for the open zones in the memory system, e.g., the first zone mapping table includes a first write pointer for at least one zone, wherein the at least one zone is in an open state, and the at least one zone is the zone recorded in the second zone mapping table. The first write pointer for any zone is not the actual write pointer for the zone but a predicted write pointer, and the first write pointer indicates the predicted next writable LBA in the zone. For example, before a certain amount of data is written into the logical address space of the memory system, the next writable LBA in the logical address space after the data is written will be first predicted, and the predicted write pointer (e.g., the first write pointer) is determined based on the predicted next writable LBA. In some examples, the first zone mapping table further includes an identifier of the at least one zone, and the identifier of each zone corresponds to the first write pointer for each zone. In order to distinguish from the first write pointer in the first zone mapping table, the write pointer for the zone in the second zone mapping table is referred to as the second write pointer, and the second write pointer is the actual write pointer for the zone.

Next, by the method of operating the memory system shown in FIG. 4, the maintenance and management process of the first zone mapping table and the second zone mapping table is introduced as follows: wherein the memory system may include the memory system 102 introduced above, and the memory system includes a memory controller and a non-volatile storage device, the memory controller may be the memory controller 22 introduced above, and the non-volatile storage device may be the non-volatile storage device 21 introduced above. The method is configured to be performed by the memory controller, and the method includes the following operations.

401. the memory controller receives a write instruction, the write instruction including first data and a first logical block address LBA, the first LBA belonging to a logical address space corresponding to a non-volatile storage device.

Taking the memory system 102 shown in FIG. 1 as an example, the logical address space may be a logical address space corresponding to at least one non-volatile storage device 21 in the memory system 102, and the logical address space includes multiple LBAs, the logical address space may be divided into multiple zones, the method of dividing zones is introduced in the above and will not be repeated here.

The first data is the data to be written carried by the write instruction, and the first LBA is the starting write location of the first data in the logical address space, the first LBA is any LBA in the logical address space, for the convenience of description, the zone in which the first LBA among the multiple zones is located is referred to as the first zone, the first zone is currently in an empty state or an open state, here, the example of the present application does not limit the state that the first zone is currently in.

The write command may be a write instruction sent by the host to the memory controller, e.g., the write command is a write instruction triggered by the host to write user data, and in this case, the first data is user data provided by the host, or the write command may also be a write instruction triggered by the host during a garbage collection (GC) process, and in this case, the first data is data that needs to be saved during the garbage collection process.

Figure 4:
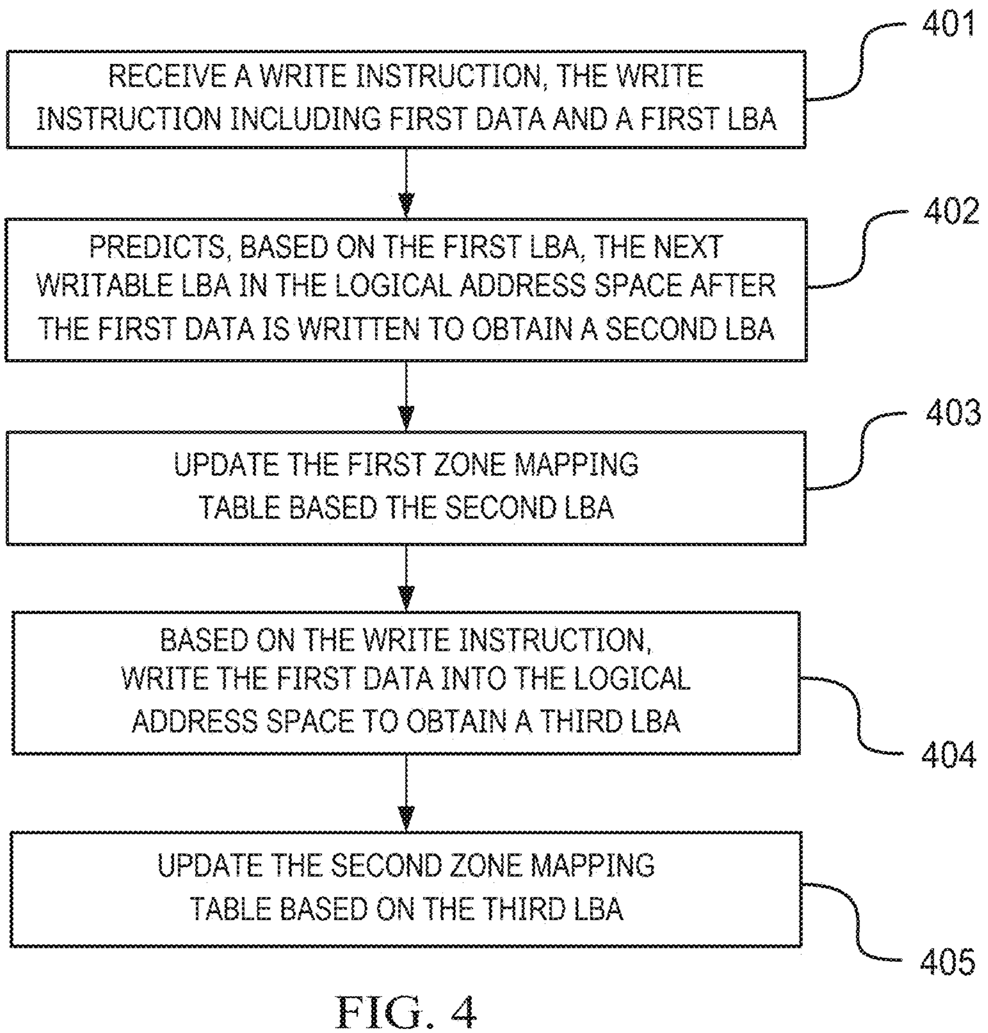
FIG. 4 is a flowchart of a method of operating a memory system shown according to an example of the present disclosure.

After receiving the write instruction, the memory controller obtains the LBA from the write instruction, takes the LBA obtained from the write instruction as the first LBA, determines the first zone which the first LBA among the multiple zones is located, and checks whether the first zone is in a valid state, if the first zone is in a valid state, then each operation after operation 401 in FIG. 4 is performed; otherwise, no operation after operation 401 in FIG. 4 is performed.

The valid state includes an empty state or an open state, based on this, the process of checking whether the first zone is in a valid state is introduced.

After determining the first zone, the memory controller may first check whether the first zone is in an open state, and if the first zone is in an open state, it is determined that the first zone is in a valid state, while if the first zone is not in an open state, then check whether the first zone is in an empty state, if the first zone is in an empty state, it is determined that the first zone is in a valid state, if the first zone is not in an empty state, then the first zone is not in a valid state, and it is determined that the first zone is in an invalid state, wherein the invalid state includes the full state.

Alternatively, the memory controller may first check whether the first zone is in an empty state, and if the first zone is in an empty state, it is determined that the first zone is in a valid state, while if the first zone is not in an empty state, then check whether the first zone is in an empty state, if the first zone is in an open state, it is determined that the first zone is in a valid state, if the first zone is not in an open state, then the first zone is not in a valid state, and it is determined that the first zone is in an invalid state.

In some examples, the memory controller may check whether the first zone is in an open state based on the first zone mapping table or the second zone mapping table, e.g., for any one of the first zone mapping table and the second zone mapping table, the memory controller searches the zone mapping table for the identifier of the first zone, if an identifier of the first zone exists in the zone mapping table, it is determined that the first zone is in the open state, if no identifier of the first zone exists in the zone mapping table, it is determined that the first zone is not in the open state.

In some examples, a third zone mapping table is also stored in the memory system, taking FIG. 1 as an example, the third zone mapping table is stored in the memory 224 of the memory controller 22 or the non-volatile storage device 21. The third zone mapping table is used to record each empty zone in the memory system, the third zone mapping table may include an identifier of at least one empty zone, or the third zone mapping table may also include a write pointer for the at least one empty zone, the write pointer for any empty zone corresponds to the identifier of the empty zone, and the write pointer for an empty zone is 0. The memory controller may check whether the first zone is in an empty state based on the third zone mapping table, e.g., search the third zone mapping table for the identifier of the first zone, if an identifier of the first zone exists in the third zone mapping table, it is determined that the first zone is in the open state, while if no identifier of the first zone exists in the third zone mapping table, it is determined that the first zone is not in the open state.

402. The memory controller predicts the next writable LBA in the logical address space after the first data is written based on the first LBA, to obtain a second LBA.

The second LBA is the predicted next writable LBA in the logical address space after the first data is written, and the second LBA is larger than the first LBA. The second LBA may be located in the first zone in which the first LBA is located, or may not be located in the first zone in which the first LBA is located. If the second LBA is not located in the first zone in which the first LBA is located, the zone in which the second LBA is located in the logical address space is referred to as the second zone, and the second zone is located after the first zone. Other zones may or may not exist between the first zone and the second zone, e.g., if the first zone is zone 1 and the second zone is zone 2, then no other zones may exist between the first zone and the second zone. As another example, if the first zone is zone 1 and the second zone is zone 3, then a zone 2 may exist between the first zone and the second zone, wherein whether other zones may exist between the first zone and the second zone depends on the location of the first LBA in the first zone and the length of the first data in the logical address space.

The memory controller may obtain the data to be written carried by the write instruction as the first data, determine the number of LBAs required to store the first data based on the data amount of the first data, and determine the sum value of the number of LBAs and the first LBA as the second LBA.

In other examples, if the first zone is in an invalid state, that is, the first zone is in a full state, the memory controller may also obtain the second LBA by performing the operation 402, and determine the second zone in which the second LBA is located from multiple zones. If the second zone is adjacent to the first zone, that is, no other zone may exist between the first zone and the second zone, the memory controller checks whether the second zone is in an empty state (the process is the same as the process of checking whether the first zone is in an empty state), if the second zone is in an empty state, it means that the first data may be written starting from the second zone, then the memory controller continues to perform the operations after operation 402 in FIG. 4, while if the second zone is not in an empty state, and the respective operations after operation 402 in FIG. 4 are not performed. If the second zone is not adjacent to the first zone, that is, no other zone exists between the first zone and the second zone, then the memory controller checks whether each zone between the first zone and the second zone is in an empty state (the process is the same as the process of checking whether the first zone is in an empty state), and also checks whether the second zone is in an empty state, if the second zone and each zone between the first zone and the second zone are in an empty state, it means that subsequently, the first data may be written starting from the zones after the first zone until data is written into the second zone, then the memory controller continues to perform the operations after operation 402 in FIG. 4; while if the second zone or any zone between the first zone and the second zone is not in an empty state, the first data cannot be written according to the principle of sequential writing, and the operations after operation 402 in FIG. 4 are not performed.

403. The memory controller updates the first zone mapping table based the second LBA.

At this point, the first zone mapping table may be empty, or the first zone mapping table may include a first write pointer for at least one zone. For example, when the write instruction is received, the first write pointer for the open zone has not been stored in the first zone mapping table, and the first zone mapping table is empty. As another example, before receiving the write instruction, at least one zone in the memory system is in an open state, then the first zone mapping table includes the first write pointer for at least one zone, and the at least one zone is part or all of the multiple zones of the memory system, and the at least one zone is in the open state.

After obtaining the second LBA, the memory controller determines a third write pointer based on the second LBA and the ZSLBA of the zone in which the second LBA is located, wherein the third write pointer indicates the predicted next writable LBA in the zone in which the second LBA is located (e.g., the predicted next writable LBA in the logical address space after the first data is written), for example, the third write pointer indicates the second LBA. The third write pointer may be determined by determining the offset between the second LBA and the ZSLBA as the third write pointer.

The memory controller may update the first zone mapping table based on the third write pointer and the zone in which the second LBA is located. The zone in which the second LBA is located may be the first zone or the second zone, for different situations, the process of updating the first zone mapping table is introduced as follows.

When the second LBA is located in the first zone, if the first zone is currently in an open state and the first write pointer for the first zone is stored in the first zone mapping table, the memory controller updates the first write pointer for the first zone in the first zone mapping table to the third write pointer to update the first zone mapping table. For example, the first write pointer corresponding to the identifier of the first zone in the first zone mapping table is updated to the third write pointer.

If the first zone is currently in an empty state and the first write pointer for the first zone has not been stored in the first zone mapping table, then the memory controller first switches the state of the first zone to the open state (the switching method may be referred to FIG. 3 and will not be repeated here), and then sets the information related to the first zone in the third zone mapping table (e.g., the identifier of the first zone, or the identifier and write pointer for the first zone) as invalid, e.g., deletes the information related to the first zone in the third zone mapping table to indicate that the first zone is no longer in an empty state, or adds an invalid identifier associated with the information related to the first zone into the third zone mapping table to indicate that the information related to the first zone is invalid; stores the third write pointer for the first zone into the first zone mapping table to update the first zone mapping table, e.g., taking the third write pointer as the first write pointer for the first zone, establishes a mapping relationship between the identifier of the first zone and the third write pointer in the first zone mapping table to indicate that the third write pointer is the predicted write pointer for the first zone. In this case, in other examples, the memory controller may first store the third write pointer for the first zone into the first zone mapping table, and then switch the state of the first zone to the open state.

In the case that the second LBA is located in the second zone, after the first data is subsequently written starting from the first zone to the second zone, the first zone will be fully written with data, based on this, if the first zone is in an empty state, the memory controller may set the information related to the first zone in the third zone mapping table as invalid, and record the information related to the first zone in the fourth zone mapping table (e.g., record the identifier of the first zone in the fourth zone mapping table), wherein the fourth zone mapping table is used to record each full zone in the memory system, e.g., the fourth zone mapping table may include an identifier of at least one full zone.

If the first zone is in an open state, the memory controller may set the information related to the first zone in the first zone mapping table as invalid (this process is the same as the process of setting the information related to the first zone in the third zone mapping table as invalid), and record the information related to the first zone in the fourth zone mapping table. If a zone exists between the first zone and the second zone, each zone between the first zone and the second zone is currently in an empty state, subsequently, as the first data is written, each zone between the first zone and the second zone will also be fully written with data, based on this, before writing the first data, the memory controller may also set the information related to each zone between the first zone and the second zone in the third zone mapping table as invalid (this process is the same as the processing of setting the information related to the first zone in the third zone mapping table as invalid), and record the information related to each zone between the first zone and the second zone in the fourth zone mapping table.

The second zone is currently in an empty state, subsequently, as the first data is written, the second zone is in an open state, at this time, the first zone mapping table does not include information related to the second zone, based on this, the memory controller may set the information related to the second zone in the third zone mapping table as invalid (this process is the same as this process of setting the information related to the first zone in the third zone mapping table as invalid), store the third write pointer for the second zone into the first zone mapping table to update the first zone mapping table, e.g., taking the third write pointer as the first write pointer for the second zone, establishes a mapping relationship between the identifier of the second zone and the third write pointer in the first zone mapping table.

404. The memory controller writes the first data into the logical address space based on the write instruction, to obtain a third LBA, wherein the third LBA is the next writable LBA in the logical address space.

Wherein the third LBA is the next writable LBA in the logical address space after the first data is written, e.g., the LBA next to the termination write LBA of the first data.

Based on the indication of the write instruction, the memory controller writes the first data into the logical address space in a sequential writing manner starting from the first LBA in the logical address space, e.g., based on the first data, performing a write operation on at least one physical address in the physical address space of the non-volatile storage device corresponding to the logical address space to write the first data into the at least one physical address, and according to the ascending order of LBAs, establishes a mapping relationship between the at least one physical address and at least one LBA after the first LBA in the logical address space in the logical to physical mapping table, so as to write the first data into the logical address space. The memory controller may use the LBA next to the largest LBA in the at least one LBA as the third LBA.

405. The memory controller updates the second zone mapping table based on the third LBA.

At this point, the second zone mapping table may be empty, or the second zone mapping table may include a second write pointer for at least one zone. For example, when the write instruction is received, the second write pointer for the open zone has not been stored in the second zone mapping table, and the second zone mapping table is empty. As another example, before receiving the write instruction, at least one zone in the memory system has been in an open state, then the second zone mapping table includes the second write pointer for at least one zone, and the at least one zone is part or all of the multiple zones of the memory system, and the at least one zone is in the open state.

The memory controller obtains a fourth write pointer based on the third LBA, the fourth write pointer is the actual write pointer for the zone in which the third LBA is located after the first data is written, and the next available LBA indicated by the fourth write pointer may be the third LBA. The process of obtaining the fourth write pointer may be: taking the offset between the ZSLBA of the zone in which the third LBA is located and the third LBA as the fourth write pointer.

After determining the fourth write pointer, taking the zone in which the fourth write pointer is located as the target zone, the memory controller searches the second zone mapping table for the second write pointer for the target zone based on the identifier of the target zone, e.g., searching the second zone mapping table for the identifier of the target zone, if the identifier of the target zone exists in the second zone mapping table, the write pointer corresponding to the identifier of the target zone in the second zone mapping table is obtained as the second write pointer for the target zone, if the identifier of the target zone does not exist in the second zone mapping table, the second zone mapping table does not include the second write pointer for the target zone, that is, no second write pointer for the target zone is searched.

If a second write pointer for the target zone is searched in the second zone mapping table, the memory controller updates the second write pointer for the target zone to the fourth write pointer in the second zone mapping table; while if no second write pointer for the target zone is searched in the second zone mapping table, the memory controller stores the fourth write pointer into the second zone mapping table, e.g., establishes a mapping relationship between the target identifier of the zone and the fourth write pointer in the second zone mapping table.

It is to be noted that when the first data writing is completed normally, the third LBA should be the same as the second LBA, the fourth write pointer should be the same as the third write pointer, and the target zone should be the zone in which the second LBA is located, based on this, after the third write pointer is stored in the first zone mapping table and the fourth write pointer is stored in the second zone mapping table, the write pointer for the target zone in the first zone mapping table is the same as the write pointer for the target zone in the second zone mapping table. In the case that the writing of the first data fails, the first data may not be written, or the writing may not be completed, if the first data is not written, the memory controller may not obtain the third LBA and may not perform the operation of updating the second zone mapping table based on the third LBA, thus, the write pointer for the zone in which the second LBA is located in the first zone mapping table is different from the write pointer for the zone in the second zone mapping table. Alternatively, if the writing of the first data is not completed and the obtained third LBA is different from the second LBA, after the second zone mapping table is updated based on the third LBA, the fourth write pointer in the second zone mapping table is also different from the third write pointer in the first zone mapping table.

After the fourth write pointer is stored into the second zone mapping table, the fourth write pointer is the new second write pointer for the target zone in the second zone mapping table. If a new write instruction is subsequently received again, the zone indicated by the identifier of the zone in the new write instruction may be the new first zone, and the processes shown in operations 401 to 405 above will be performed for the new first zone, thus, the first write pointer for each open zone in the memory system may be recorded in the first zone mapping table, so that the first zone mapping table may include the first write pointers for multiple (open) zones. The second write pointer for each open zone in the memory system may be recorded in the second zone mapping table, so that the second zone mapping table may include the second write pointers for multiple (open) zones.

In the method provided by the example of the present application, the next writable LBA in the logical address space after the data is written this time is predicted based on the write instruction, and the predicted write pointer in the first zone mapping table is updated based on the predicted next writable LBA, thereby maintaining the predicted write pointers for multiple zones in the memory system through the first zone mapping table, and after the write instruction is executed, the second zone mapping table is updated based on the next actual writable LBA in the logical address space after the data is written this time, thereby maintaining the predicted write pointers for multiple zones in the memory system through the second zone mapping table, in order to subsequently determine the dirty zone in the memory system through the first zone mapping table and the second zone mapping table.

The first zone mapping table and the second zone mapping table may be initially stored in the memory of the memory controller, as the first zone mapping table and the second zone mapping table are continuously updated, and the first zone mapping table and the second zone mapping table in the memory become larger and larger, then the memory controller may store the updated first zone mapping table and the second zone mapping table into the non-volatile storage device, e.g., after operation 403 is performed, the updated first zone mapping table is obtained, and the updated first zone mapping table is stored into the non-volatile storage device, and after operation 405 is performed, the updated second zone mapping table is obtained, and the updated second zone mapping table is stored into the non-volatile storage device, wherein the non-volatile storage device used to store the first zone mapping table and the non-volatile storage device used to store the second zone mapping table may be the same non-volatile storage device, or they may be different non-volatile storage devices.

In some examples, the memory controller may also periodically store the first zone mapping table and the second zone mapping table into the non-volatile storage device. For example, at least one of the operations are performed: the first zone mapping table is stored into the non-volatile storage device every time a first period of time passes, or the second zone mapping table is stored into the non-volatile storage device every time a second period of time passes. Wherein, the first period of time and the second period of time are the periods in which the first zone mapping table and the second zone mapping table are periodically stored in the non-volatile storage device respectively, and the first period of time and the second period of time may be the same or different, the first period of time and the second period of time may be set according to the actual application scenario, here, the example of the present application does not limit the first period of time and the second period of time.

In other examples, checkpoint data is stored in the memory of the memory controller, and the checkpoint data may be written to a non-volatile storage device in the memory system through a checkpoint operation.

During the process of writing data into the non-volatile storage device in the memory system based on one or more write instructions, the memory controller also stores checkpoint data into the memory of the memory controller, the checkpoint data includes information associated with the currently written data, e.g., the information may include a logical-to-physical address mapping relationship table (e.g., L2P table), a first zone mapping table, a second zone mapping table, a third zone mapping table, and a fourth zone mapping table, etc. Wherein the first zone mapping table, the third zone mapping table and the fourth zone mapping, etc., may be updated and maintained by the FE in the firmware running on the memory controller, so that the FE, after receiving the write instruction, may immediately update the first zone mapping table based on the write instruction, the L2P table and the second zone mapping table may be updated and maintained by FTL in the firmware running on the memory controller, so that after the execution of the write instruction is completed, FTL, after updating the physical address corresponding to the LBA related to the write instruction in the L2P table, updates the second write pointer for the zone in the second zone mapping table according to the physical address. In some examples, the information may also include at least one of information indicating the operating state of the firmware or some information customized for the specific firmware, which is not limited by the examples of the present application.

When a certain amount of data from the host is written into the non-volatile storage device in the memory system based on at least one received write instruction, the memory controller can be triggered to perform a checkpoint operation to store checkpoint data composed of related information into the non-volatile storage device, the certain amount is the write window size. As an example, such a write window size may be set to 16 MB, and this 16 MB may be the sum of the amount of data written based on multiple write instructions, may be the amount of data written based on a write instruction, or may be the amount of part of data written based on a write instruction, and under the control of FTL, a checkpoint operation will be triggered to write related information every time the accumulated written data reaches 16 MB. For situations where the set write window size may not be an integral multiple of the unit write size (e.g., 4 KB), FTL may trigger a checkpoint operation once the accumulated written data exceeds the write window size.

In the case that the checkpoint data includes the first zone mapping table and the second zone mapping table, the memory controller stores the first zone mapping table and the second zone mapping table into the non-volatile storage device through the checkpoint operation.

In any storage method of storing the first zone mapping table and the second zone mapping table into a non-volatile storage device, the first zone mapping table and the second zone mapping table may be stored from the memory of the memory controller into the non-volatile storage device to reduce memory usage and avoid data loss in the first zone mapping table and the second zone mapping table caused by dirty power loss. For example, in the event of dirty power loss of the memory system, the data in the memory of the memory controller will be lost, and during the power-on phase after the dirty power loss, the memory controller may load the first zone mapping table and the second zone mapping table stored in the non-volatile storage device into the memory of the memory controller, to restore the lost first zone mapping table and the second zone mapping table in the memory, so that subsequently, the memory controller may determine the dirty zone in the memory system based on the first zone mapping table and the second zone mapping table.

Figure 5:
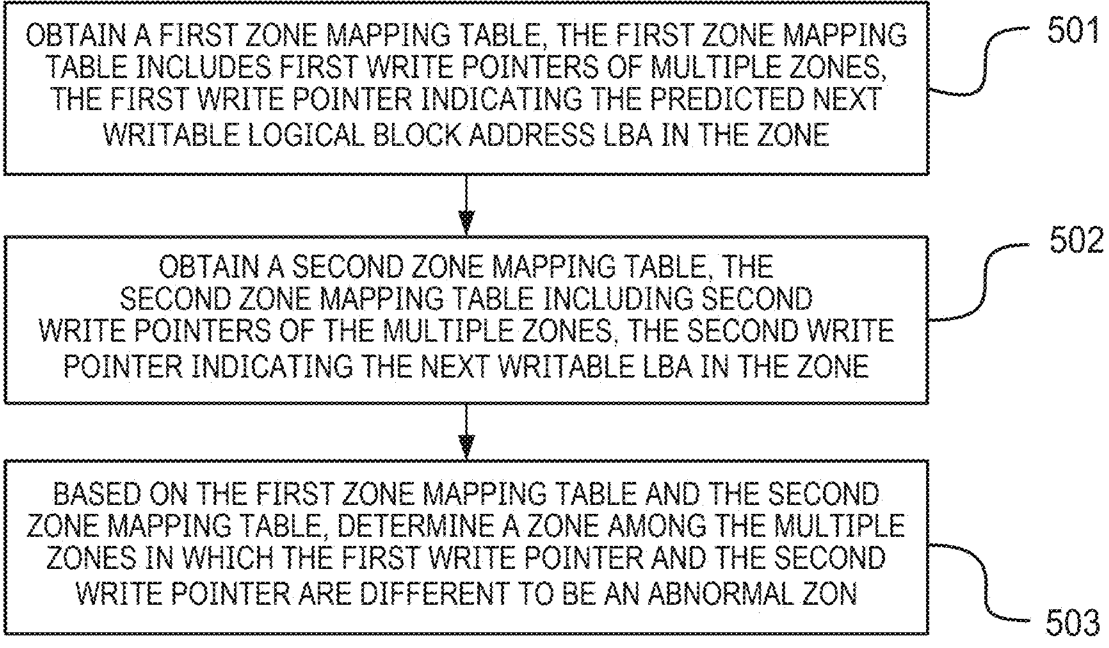
FIG. 5 is a flowchart of a method of operating another memory system shown according to an example of the present disclosure.

Next, through the operation method flow of the memory system shown in FIG. 5, the use process of the first zone mapping table involved above is introduced, and the method is performed by the memory controller in the memory system, wherein the memory system may be the memory system 102 introduced above, and the memory system includes a memory controller and a non-volatile storage device, the memory controller may be the memory controller 22 introduced above, and the non-volatile storage device may be the non-volatile storage device 21 introduced above. The method includes the following operations.

501. obtaining a first zone mapping table, the first zone mapping table includes first write pointers for multiple zones, the multiple zones are obtained by dividing the logical address space corresponding to the non-volatile storage device, the first write pointer indicating the predicted next writable LBA in the zone.

Wherein, the multiple zones are all in an open state, and the maintaining process of the first zone mapping table may be referred to the FIG. 4 described above and will not be repeated here. Taking FIG. 1 as an example, the first zone mapping table may be stored in the memory 224 in the memory controller 22 or the non-volatile storage device 21 in the memory system 102, and the memory controller 22 may search the first zone mapping table in the memory 224, if a first zone mapping table exists in the memory 224, the first zone mapping table may be obtained from the memory 224, while if no first zone mapping table exists in the memory 224, the first zone mapping table stored in the non-volatile storage device 21 is loaded into the memory 224 first, and then the first zone mapping table is obtained from the memory 224. Alternatively, the first zone mapping table is obtained from the non-volatile storage device 21 first, and then the first zone mapping table is loaded into the memory 224.

502. obtaining a second zone mapping table, the second zone mapping table including second write pointers for the multiple zones, the second write pointer indicating the next writable LBA in the zone.

Wherein the multiple zones are zones in the open state in the memory system, and in other examples, for any open zone recorded in the first zone mapping table, the second write pointer for the zone may or may not exist in the second zone mapping table, and taking the first zone involved in FIG. 4 as an example, if the operation 502 is performed after operation 405, the third write pointer stored in the first zone mapping table is the fourth write pointer for the target zone in the second zone mapping table, if the first zone is in an empty state when the write instruction is received and the write pointer for the target zone has not been stored in the second zone mapping table, and dirty power loss occurs in the memory system after operation 404 is performed and before operation 405 is performed, which results in not enough time for the memory controller to store the fourth write pointer for the target zone into the second zone mapping table, then during the power-on phase after the dirty power loss, no fourth write pointer for the target zone is stored in the second zone mapping table obtained by the memory controller.

The memory controller obtains the first zone mapping table in a manner same as the way of obtaining the second zone mapping table, and this operation 502 will not be repeated.

503. by the memory controller, based on the first zone mapping table and the second zone mapping table, determining a zone in the multiple zones for which the first write pointer and the second write pointer are different to be a dirty zone.

For the identifier of any zone in the second zone mapping table, the first zone mapping table is searched for the first write pointer corresponding to the identifier of the zone, and if no first write pointer corresponding to the identifier of the zone exists in the first zone mapping table, the zone is determined to be a dirty zone. If a first write pointer corresponding to the identifier of the zone exists in the first zone mapping table, the first write pointer corresponding to the identifier of the zone is compared with the second write pointer corresponding to the identifier of the zone in the second zone mapping table, and if the second write pointer is the same as the first write pointer, the zone is determined to be a normal zone, while if the second write pointer is different from the first write pointer, the zone is determined to be a dirty zone.

Figure 6:
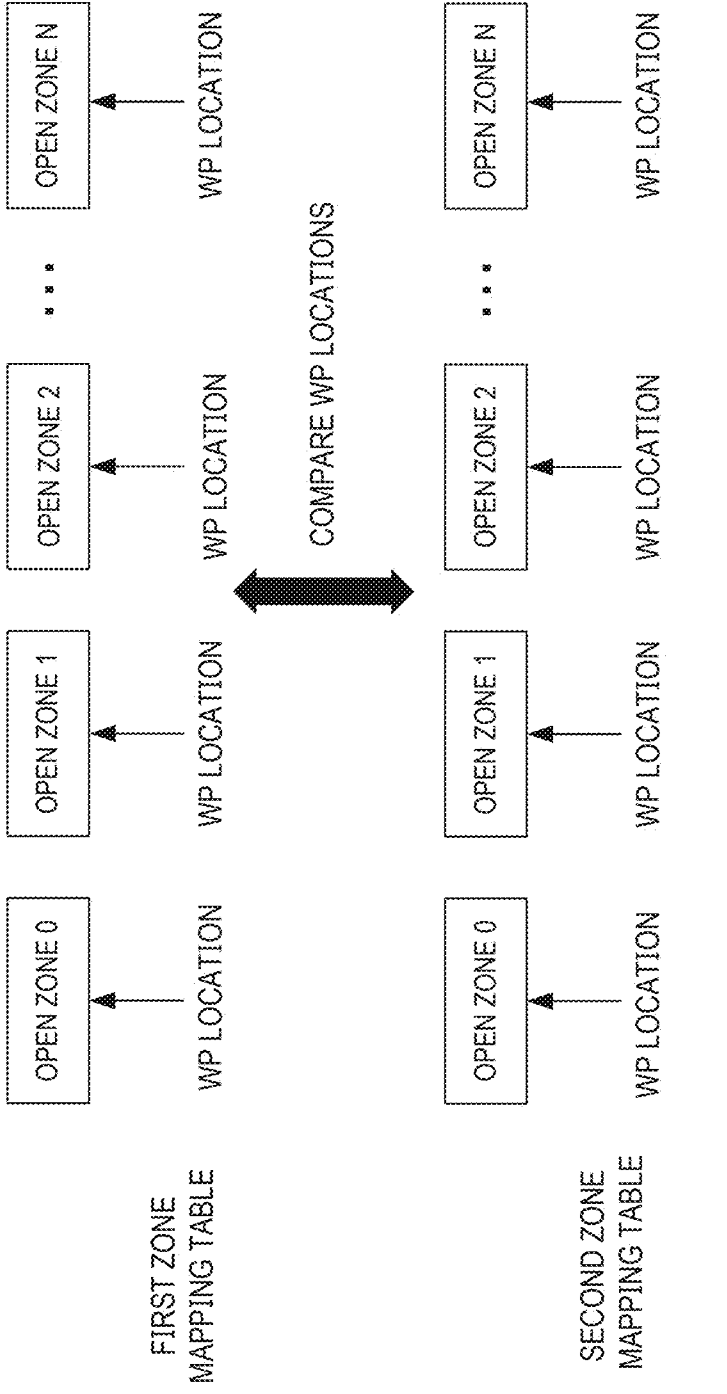
FIG. 6 is a schematic diagram of determining a dirty zone shown according to an example of the present disclosure.

Taking FIG. 6 as an example, assuming that N+1 open zones exist in the memory system, which are open zone 0 to open zone N, N is an integer greater than 0, and the write pointers (WP) for open zones 0-N stored in the first zone mapping table are all first write pointers, and the WPs of open zones 0-N stored in the second zone mapping table are all second write pointers, taking open zone 2 as an example, after an update is made to the write pointer for open zone 2 in the second zone mapping table, the location indicated by the WP of open zone 2 in the second zone mapping table is the same as the location indicated by the WP of open zone 2 in the first zone mapping table, assuming that a write instruction is subsequently received instructing to write data to open zone 2, the WP of open zone 2 in the first zone mapping table is updated based on the write instruction, and the location indicated by the updated WP of open zone 2 in the first zone mapping table is back with respect to the location indicated by the WP of open zone 2 in the second zone mapping table, assuming that a dirty power loss occurs in the memory system before executing the write instruction, then in the phase after the dirty power loss in the memory system, in order to determine the dirty zone, the memory controller obtains the first zone mapping table and the second zone mapping table, and for the same open zone, compares the WPs of the open zone in the first zone mapping table and the second zone mapping table, and according to the comparison, the WP of open zone 2 in the first zone mapping table is different from the WP of open zone 2 in the second zone mapping table, e.g., the location indicated by the WP of open zone 2 in the first zone mapping table is different from the location indicated by the WP of open zone 2 in the second zone mapping table, then open zone 2 is determined as a dirty zone.

In some examples, in the power-on phase after the dirty power loss in the memory system, the operation 503 is performed, e.g., in the power-on phase after the dirty power loss in the memory system, the memory controller determines the dirty zone in the memory system by performing the process shown in operation 501 to operation 503, so that the memory controller can reconstruct the data in the dirty zone. In other examples, the memory controller periodically performs the process shown in operations 501 to 503 described above, e.g., performs the process shown in operation 501 to operation 503 described above every a third period of time, thereby periodically determining a dirty zone in the memory system in order to process the dirty zone.

The above is an example in which the first zone mapping table only records prediction pointers for open zones, and in other examples, the first zone mapping table is also used to record each empty zone and full zone in the memory system. For example, the first zone mapping table includes the identifier of each zone in the memory system, the state identifier of each zone, the first write pointer for each open zone in the memory system, the write pointer for each empty zone, and the write pointer for each full zone, the invalid write pointer for a full zone, the state identifier of any zone is used to indicate the state in which the zone is, e.g., the state identifier includes the empty state identifier, the full state identifier, and the open state identifier. The empty state identifier, full state identifier, and open state identifier are used to indicate the zone is in the empty state, full state, or open state, respectively.

Based on this, when the first zone mapping table is updated based on the second LBA, in the case that the second LBA is located in the first zone, if the state identifier of the first zone in the first zone mapping table is an empty state identifier or a full state identifier, the memory controller updates the state identifier of the first zone in the second zone mapping table to the open state identifier, updates the write pointer for the first zone in the first zone mapping table to the third write pointer; and if the state identifier of the first zone in the first zone mapping table is an open state identifier, the first write pointer for the first zone in the first zone mapping table is updated to the third write pointer, such that the third write pointer is taken as the new first write pointer for the first zone. In the case that the second LBA is located in the second zone, the state identifier of the first zone in the first zone mapping table is updated to the full state identifier, and the state identifier of the second zone in the first zone mapping table is updated to the open state identifier, and the write pointer for the second zone in the first zone mapping table is updated to the third write pointer, if the second zone is not adjacent to the first zone, the state identifier of each zone between the first zone and the second zone in the second mapping table is also updated to the full state identifier.

The process of determining a dirty zone is: for the identifier of any zone in the second zone mapping table, if the state identifier corresponding to the identifier of the zone in the first zone mapping table is an empty state identifier or a full state identifier, then the zone is determined to be a dirty zone; and if the state identifier corresponding to the identifier of the zone in the first zone mapping table is an open state identifier, the second write pointer corresponding to the identifier of the zone in the second zone mapping table is compared with the first write pointer corresponding to the identifier of the zone in the first zone mapping table, and if the second write pointer is the same as the first write pointer, the zone is determined to be a normal zone, while if the second write pointer is different from the first write pointer, the zone is determined to be a dirty zone.

The technical solutions provided by an example shown in FIG. 5 may determine a dirty zone from multiple zones with the predicted write pointer for the zone in the first zone mapping table and the current write pointer for the zone in the second zone mapping table, thus the method of determining a dirty zone is simple and can quickly determine a dirty zone in a zoned storage device, thereby effectively shortening the time for reconstructing data for a dirty zone and the time for restarting the memory system.

The above description is only an optional example of the present application, and is not intended to limit the application, and any modification, equivalent replacement and improvement, etc., made within the spirit and principles of this application shall be included within the protection scope of this application.

What is claimed is:

1. A method of operating a memory system, comprising:

obtaining a first zone mapping table, wherein the first zone mapping table includes first write pointers for multiple zones, the multiple zones are obtained by dividing a logical address space corresponding to a non-volatile storage device, and a first write pointer indicates a predicted next writable logical block address (LBA) in a zone;

obtaining a second zone mapping table, wherein the second zone mapping table includes second write pointers for the multiple zones, and a second write pointer indicates a next writable LBA in a zone; and during a power-on phase after dirty power loss of the memory system, determining a zone in the multiple zones, for which the first write pointer and the second write pointer are different, to be a dirty zone based on the first zone mapping table and the second zone mapping table.

2. The method of claim 1, wherein the multiple zones are in an open state.

3. The method of claim 1, further comprising:

receiving a write instruction, the write instruction comprising first data and a first LBA;

predicting, based on the first LBA, a next writable LBA in the logical address space after the first data is written, to obtain a second LBA; and updating the first zone mapping table based on the second LBA.

4. The method of claim 3, wherein after updating the first zone mapping table, the method further comprises:

storing the updated first zone mapping table in a non-volatile storage device.

5. The method of claim 3, wherein after updating the first zone mapping table, the method further comprises:

writing the first data into the logical address space based on the write instruction, to obtain a third LBA, wherein the third LBA is a next writable LBA in the logical address space; and updating the second zone mapping table based on the third LBA.

6. The method of claim 3, further comprising at least one of:

storing the first zone mapping table into a non-volatile storage device every time a first period of time passes; or storing the second zone mapping table into a non-volatile storage device every time a second period of time passes.

7. The method of claim 3, further comprising:

storing the first zone mapping table and the second zone mapping table into a non-volatile storage device by a checkpoint operation.

8. The method of claim 1, further comprising storing the first zone mapping table and the second zone mapping table into a non-volatile storage device by a checkpoint operation.

9. The method of claim 1, further comprising determining a second zone in the multiple zones, for which the first write pointer corresponding to the second zone does not exist, to be a dirty zone.

10. A method of operating a memory system, comprising:

receiving a write instruction, the write instruction comprising first data and a first logical block address (LBA), and the first LBA belonging to a logical address space corresponding to a non-volatile storage device;

predicting, based on the first LBA, a next writable LBA in the logical address space after the first data is written, to obtain a second LBA; and updating a first zone mapping table based on the second LBA, the first zone mapping table comprising first write pointers for multiple zones in the logical address space, and a first write pointer indicating a predicted next writable LBA in a zone;

obtaining a second zone mapping table, the second zone mapping table comprising second write pointers for the multiple zones, and a second write pointer indicating a next writable LBA in a zone; and during a power-on phase after dirty power loss of the memory system, determining a zone in the multiple zones, for which the first write pointer and the second write pointer are different, to be a dirty zone based on the first zone mapping table and the second zone mapping table.

11. The method of claim 10, wherein after updating the first zone mapping table, the method further comprises:

writing the first data into the logical address space based on the write instruction, to obtain a third LBA, wherein the third LBA is a next writable LBA in the logical address space; and updating the second zone mapping table based on the third LBA.

12. The method of claim 10, further comprising at least one of:

storing the first zone mapping table into a non-volatile storage device every time a first period of time passes; or storing the second zone mapping table into a non-volatile storage device every time a second period of time passes.

13. The method of claim 10, wherein the multiple zones are in an open state.

14. The method of claim 10, further comprising determining a second zone in the multiple zones, for which the first write pointer corresponding to the second zone does not exist, to be a dirty zone.

15. A memory system, comprising:

a non-volatile storage device; and a memory controller configured to:

obtain a first zone mapping table, wherein the first zone mapping table includes first write pointers for multiple zones, the multiple zones are obtained by dividing a logical address space corresponding to the non-volatile storage device, and a first write pointer indicates a predicted next writable logical block address (LBA) in a zone;

obtain a second zone mapping table, wherein the second zone mapping table includes second write pointers for the multiple zones, and a second write pointer indicates a next writable LBA in a zone; and during a power-on phase after dirty power loss of the memory system, determine a zone in the multiple zones, for which the first write pointer and the second write pointer are different, to be a dirty zone based on the first zone mapping table and the second zone mapping table.

16. The memory system of claim 15, wherein the multiple zones are in an open state.

17. The memory system of claim 15, wherein the memory controller is further configured to:

receive a write instruction, the write instruction comprising first data and a first LBA;

predict, based on the first LBA, a next writable LBA in the logical address space after the first data is written, to obtain a second LBA; and update the first zone mapping table based on the second LBA.

18. The memory system of claim 17, wherein the memory controller is further configured to:

write the first data into the logical address space based on the write instruction, to obtain a third LBA, wherein the third LBA is a next writable LBA in the logical address space; and update the second zone mapping table based on the third LBA.

19. The memory system of claim 17, wherein the memory controller is further configured to at least one of:

store the first zone mapping table into a non-volatile storage device every time a first period of time passes; or store the second zone mapping table into a non-volatile storage device every time a second period of time passes.

20. The memory system of claim 17, wherein the memory controller is further configured to:

store the first zone mapping table and the second zone mapping table into a non-volatile storage device by a checkpoint operation.

* * * * *